United States Patent
McLaughlin

[19]

[11] Patent Number: 6,029,384
[45] Date of Patent: Feb. 29, 2000

[54] PICTURE FRAME FOR MOUNTING A PICTURE FROM AN AUTOMOBILE DASHBOARD

[76] Inventor: Ron McLaughlin, 5111 66th St. N., Suite 400, St. Petersburg, Fla. 33709

[21] Appl. No.: 09/096,396

[22] Filed: Jun. 11, 1998

[51] Int. Cl.[7] ...................................................... A47G 1/06
[52] U.S. Cl. ................................ 40/737; 40/757; 40/593; 40/749
[58] Field of Search .............................. 40/757, 737, 749, 40/761, 591, 593; 248/688, 470, 126

[56] References Cited

U.S. PATENT DOCUMENTS

| | | |
|---|---|---|
| 366,715 | 7/1887 | Damlos . |
| 1,289,130 | 12/1918 | Duncan .................................. 248/470 |
| 5,259,579 | 11/1993 | Schneider . |
| 5,388,353 | 2/1995 | Givnan ..................................... 40/737 |
| 5,489,055 | 2/1996 | Levy . |
| 5,639,052 | 6/1997 | Sauve . |

FOREIGN PATENT DOCUMENTS

| | | | |
|---|---|---|---|
| 125339 | 4/1919 | United Kingdom ................. | 40/152.1 |

*Primary Examiner*—Cassandra H. Davis
*Attorney, Agent, or Firm*—Dennis G. LaPointe; Mason & Associates, P.A.

[57] ABSTRACT

A picture frame and method for mounting on a dashboard of an automobile. The picture frame includes a transparent picture holder with a pivotable U-shaped supporting member on the backside of the holder with bent ends at the distal ends of the U-shaped supporting member, the bent distal ends being detachably secured to vertical grill portions of a ventilation grill assembly or to a closed ash tray compartment or to a closed glove box compartment of an automobile dashboard. A spring-tensioned clip attached to a flexible elongated strap which is wrapped around an intermediate segment of the U-shaped support member is optionally included wherein the opposite ends of the flexible strap are joined together juxtaposed the spring-tensioned clip for clipping the picture frame to a convenient location on the dashboard. A rigid member with a spring-tensioned clip at one end and the opposite end rotatably attached to the intermediate segment is also optionally included for clipping the picture frame to a convenient location on the dashboard.

16 Claims, 4 Drawing Sheets

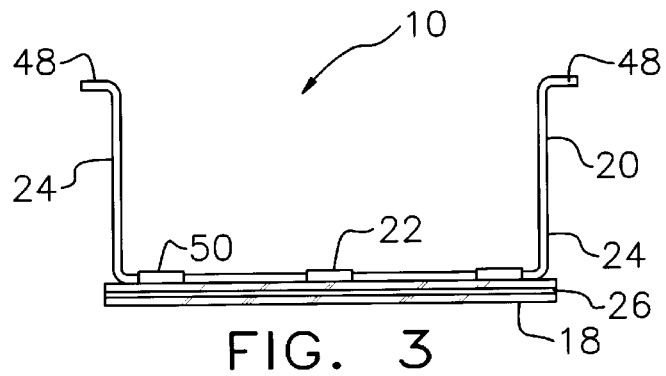
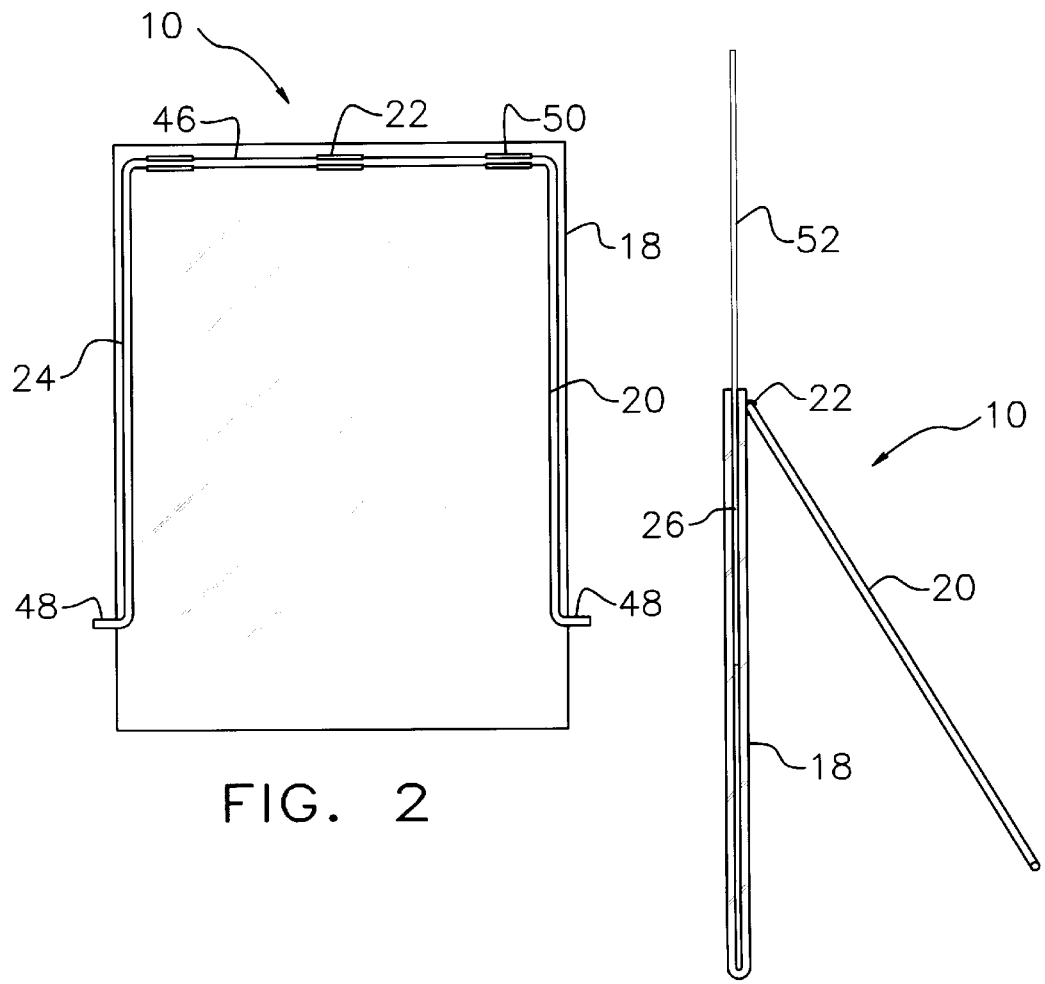

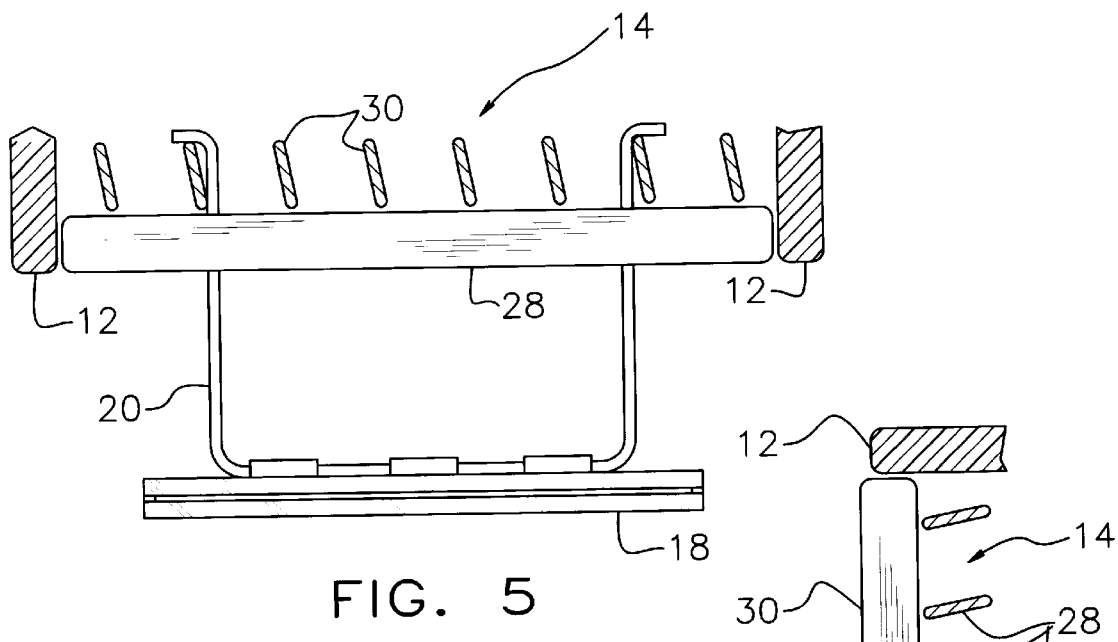
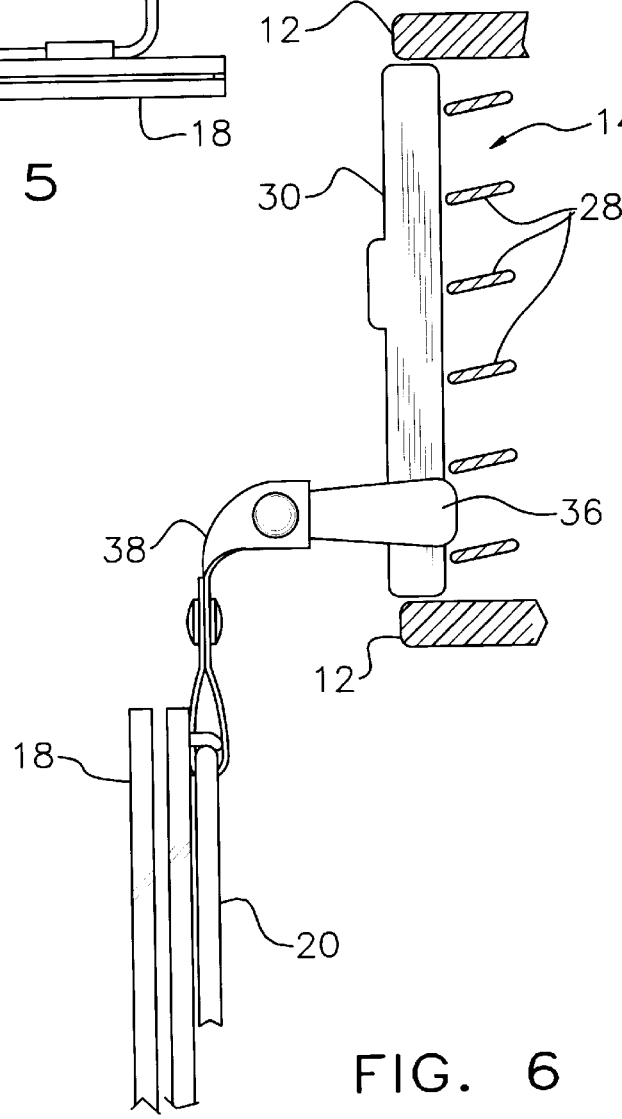
FIG. 5
FIG. 6

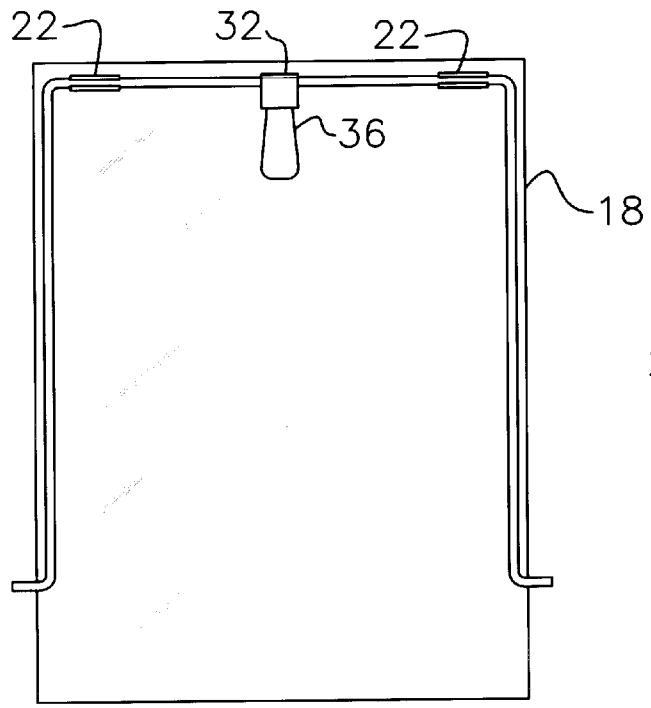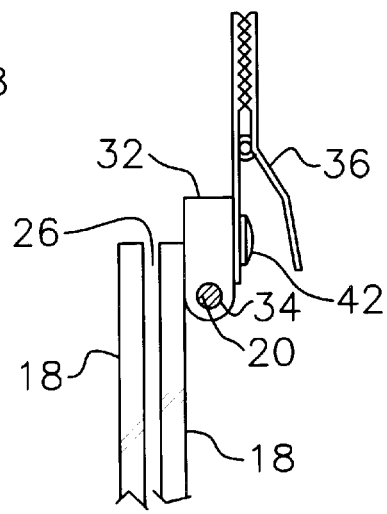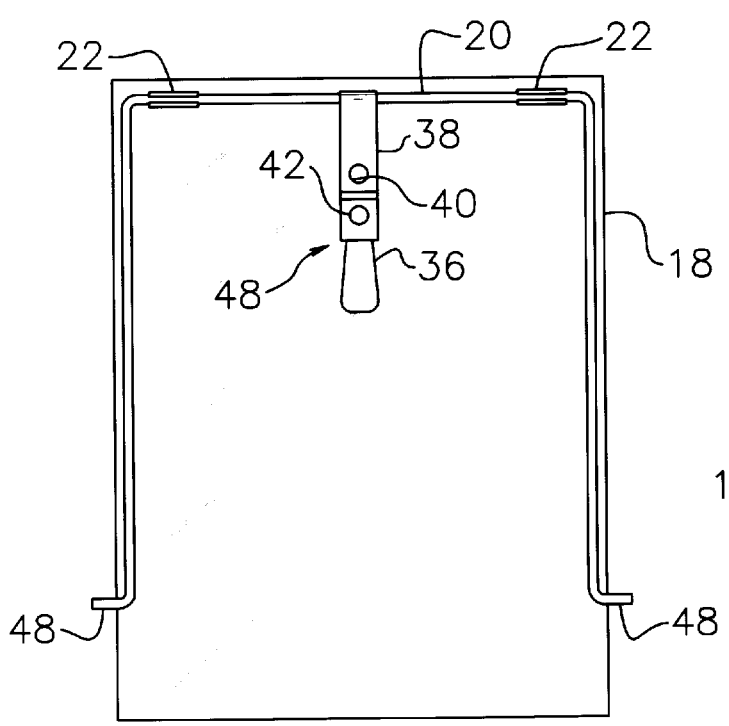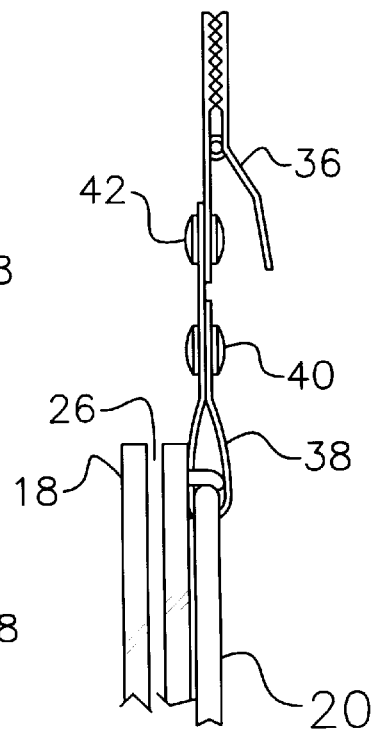
FIG. 7
FIG. 8
FIG. 9
FIG. 10

PICTURE FRAME FOR MOUNTING A PICTURE FROM AN AUTOMOBILE DASHBOARD

BACKGROUND OF THE INVENTION

1. Field of the Invention

The invention relates to a picture frame for mounting a picture from an automobile dashboard ventilation grill assembly, ash tray compartment, or glove box compartment and method of hanging the picture frame from said automobile dashboard.

2. Description of Related Art

Picture frame holders are generally known in the art. For example, U.S. Pat. No. 366,715 to Damlos is a picture frame which incorporates a wire support. However, picture frames holders for mounting on a dashboard of an automobile are not generally known in the art. Most considerations are instead given to developing cup holders for use in an automobile as depicted in U.S. Pat. No. 5,639,052 to Sauve, U.S. Pat. No. 5,489,055 to Levy and U.S. Pat. No. 5,259,579 to Schneider.

Therefore, it is an object of the present invention to provide a simple and novel picture frame holder for displaying a picture and for mounting the picture from a ventilation grill assembly, a closed ash tray compartment, or a closed glove box compartment of an automobile dashboard. It is anticipated that travelers away from home will have fond memories of loved ones pictorially displayed in the traveler's automobile. An object of the present invention is to provide a means of satisfying this need to remember loved ones while traveling in an automobile away from home.

SUMMARY OF THE INVENTION

The present invention provides a transparent picture holder with supporting member that can be used in various locations within the interior of an automobile; particularly, on a dashboard so that the pictured display can be viewed by the occupants of an automobile. The picture frame for mounting on a dashboard includes a transparent picture holder and a U-shaped supporting member pivotally attached to the backside of the holder. The U-shaped support member has a 90° bent portion at the distal end of each leg of the U-shaped support member. The picture holder is generally made of polymeric or plastic material and is formed by two parallel flat portions between which a picture is sandwiched. The two parallel portions are integrally joined along a bottom edge to prevent the picture from falling out. The picture is inserted between the parallel flat portions through a slot at the top or on the sides formed by the two parallel portions.

The U-shaped support member has an intermediate segment, that is, the bottom of the U-shape support member, which is pivotally attached on the backside of the picture holder at a level within the upper halve of the flat portion, preferably juxtaposed to the top edge. This arrangement allows the picture to hang in a substantially upright position within the automobile. The simple design allows for convenient relocation to alternate positions to suit the need of the driver or passenger.

The distal ends of the U-shaped support member is squeezed sufficiently to pass the ends through a ventilation grill assembly and released to engage with the vertical grill portion of the ventilation grill assembly. Alternative locations on a dashboard of an automobile from which to hang a picture include an ash tray compartment or a glove box compartment. An alternative embodiment includes attaching a spring-tensioned clip to the intermediate segment of the U-shaped support member for clipping the picture frame to an appropriate location on a dashboard or a visor or other convenient location within the automobile. The clip can be attached to the intermediate segment with a flexible strap for easy removal or by a rigid member to ensure that it does not separate from the intermediate segment. The addition of the clip provides a wide range of alternative locations from which the picture frame can hang. Although the removal flexible strap is a preferred anticipated additional feature, it is anticipated that the flexible strap may be non-removable such as being stitched or riveted.

Accordingly, it is a principal object of the invention to provide a versatile picture frame which may be used within an automobile that is inexpensive, easy to use, and that provides fond memories to occupants of an automobile by displaying memorable pictures.

These and other important objects, features and advantages of the invention will become readily apparent as this description proceeds.

The invention accordingly comprises the features of construction, combination of elements and arrangements of parts that will be exemplified in the construction hereinafter set forth, and the scope of the invention will be indicated in the claims.

BRIEF DESCRIPTION OF THE DRAWINGS

FIG. 2 is a rear perspective view of the first embodiment of the picture frame.

FIG. 3 is a plan perspective view of the first embodiment of the present invention.

FIG. 4 is a side perspective view of the first embodiment of the present invention.

FIG. 5 is a perspective view of the present invention hanging from the vertical grill portion of a ventilation grill assembly on a dashboard of an automobile, the vertical grill portion being behind the horizontal grill portion.

FIG. 6 is a perspective view of the present invention hanging from the vertical grill portion of a ventilation grill assembly on a dashboard of an automobile, the vertical grill portion being in front of the horizontal grill portion.

FIG. 7 is a rear perspective view of an alternative embodiment of the present invention incorporating a spring-tensioned clip attached to the support member with a rigid elongated member.

FIG. 8 is a perspective blow-up view of the rigid elongated member with a spring-tensioned clip.

FIG. 9 is a rear perspective view of an alternative embodiment of the present invention incorporating a spring-tensioned clip attached to the support member with a flexible elongated strap.

FIG. 10 is a perspective blow-up view of the flexible elongated strap with a spring-tensioned clip.

DETAILED DESCRIPTION OF THE INVENTION

Figure 1:
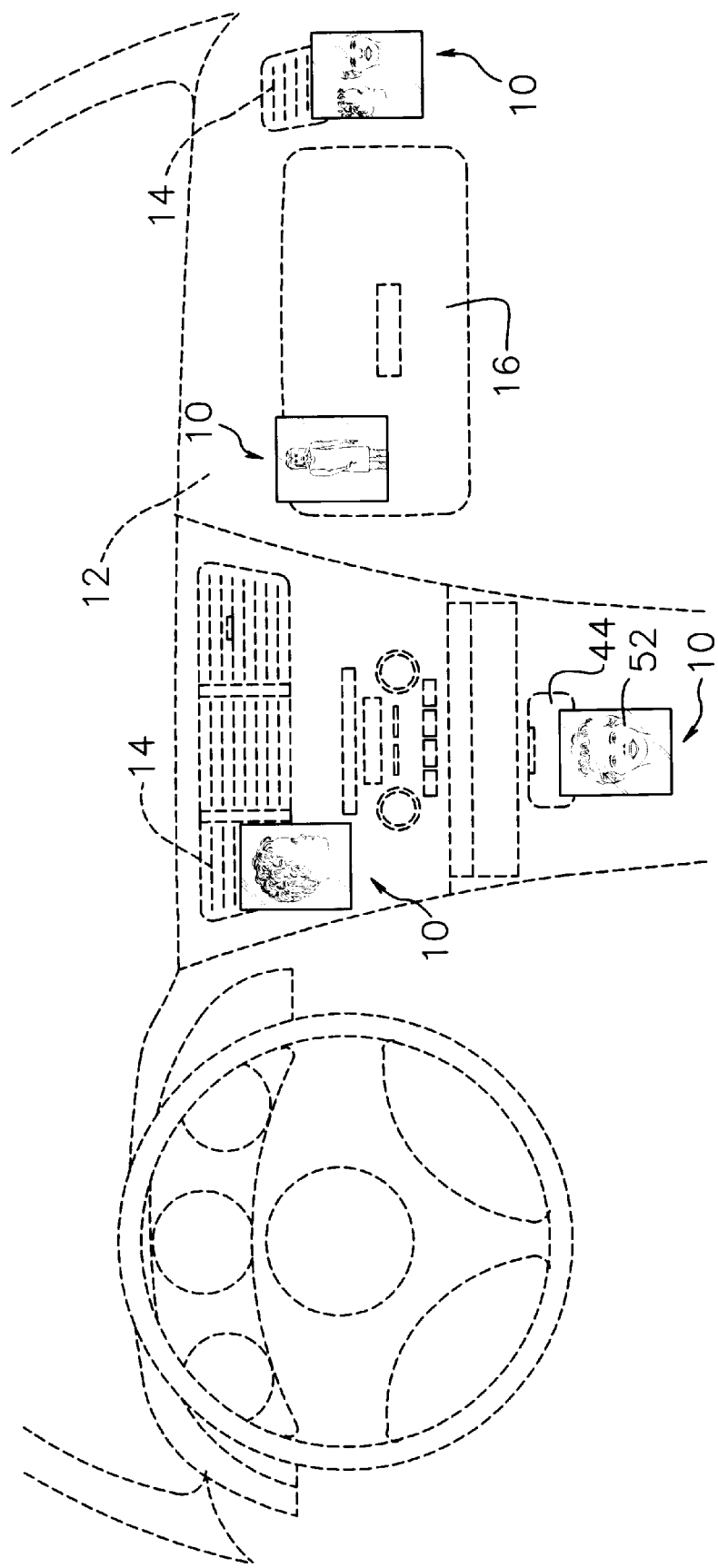
FIG. 1 is a perspective view of an automobile dashboard showing a first embodiment of the present invention secured to a ventilation grill assembly, an ash tray compartment and a glove box compartment.

Various embodying examples of the invention will now be explained with reference to the drawings.

Referring to FIG. 1, picture frame 10 is depicted hanging from various locations on a dashboard 12 of an automobile. Preferred locations from which to hang picture frame 10 include a ventilation grill assembly 14, an ash tray compartment 44 or a glove box compartment 16.

Referring to FIGS. 2–4, the picture frame for mounting on an automobile dashboard comprises a transparent polymeric picture holder 18 having a flat first portion parallel to a flat second portion, the portions being integrally connected along a bottom edge of the holder 18; a slot 26 between the parallel portions of said polymeric picture holder 18 for receiving a picture 52 to be displayed; a U-shaped support member 20 wherein the U-shaped support member 20 includes an intermediate segment 46 and a first and second segment 24, the first and second segments 24 being integrally joined at approximately a 90° angle to each end of the intermediate segment 46, each first and second segment further having a distal end; means 22 for pivotally attaching the intermediate segment 46 of the U-shaped support member 20 to a backside of the transparent polymeric picture holder 18 at a location in an upper halve portion of said backside, the intermediate segment 46 being aligned parallel to the bottom edge of the picture holder 18 such that the center of gravity of the picture holder 18 with the attached U-shaped support member 20 maintains the slot 26 for inserting the picture oriented above the bottom edge when said picture holder 18 is hung from a predetermined location on a dashboard 12 of an automobile; and means 48 for detachably securing the U-shaped support member 20 from a predetermined location on the dashboard 12 of an automobile.

The preferred embodiment's means for detachably securing the U-shaped support member 20 with picture holder 18 to a predetermined location of an automobile dashboard 12 further includes an approximate 90° bent portion at each of the distal ends of the first and second segments 24, the bent portions being aligned in a direction parallel to the intermediate segment 46 and directed opposite each other.

The U-shaped support member 20 can be made of from a polymeric material, although a preferred embodiment would make the support member from a wire to provide additional durability.

The means 22 for pivotally attaching the intermediate segment 46 of the U-shaped support member 20 to the backside of the transparent polymeric picture holder 18 includes two or more longitudinal hook-shaped connector portions 50 wherein a base of each connector portion 50 is integrally secured to the backside of the transparent polymeric picture holder 18 and a distal end of a hook formed by the hook-shaped connector portion 50 faces an opposite distal end of another hook-shaped connector portion 50 in a spaced-apart relationship such that the intermediate segment of the U-shaped support member frictionally snaps through an opening formed by the opposing hook-shaped connector portions 50 into the aperture formed by the opposing longitudinal hook-shaped connector portions 50 secured to the backside of the picture holder 18.

An additional feature of the embodiment of the means 48 for detachably securing the U-shaped support member 20 from a predetermined location on a dashboard 12 of an automobile further includes a spring-tensioned clip 36 as depicted in FIGS. 9–10, the clip 36 being secured to an end of a flexible elongated strap 38, an opposite end of said strap 38 being wrapped around the intermediate segment 46 of the U-shaped support member 20 and the opposite ends further being detachably joined juxtaposed the clip 36, preferably with a snap assembly 40. The clip 36 is generally attached to the flexible strap 38 with a rivet 42.

Another alternative embodiment featuring a clip 36 as means 48 for detachably securing the U-shaped support member 20 from a predetermined location on a dashboard 12 of an automobile further includes a spring-tensioned clip 36 as depicted in FIGS. 7–8, the clip 36 being secured to an end of a rigid elongated member 32, the rigid elongated member 32 having an aperture at an opposite end, the intermediate segment 46 of the U-shaped support member 20 passing therethrough for providing a rotatable rigid elongated member 32.

Another alternative means 22 for pivotally attaching the intermediate segment 46 of the U-shaped support member 20 to the backside of the transparent polymeric picture holder 18 is a hinge (not shown), a first portion of the hinge being secured to the back of the polymeric picture holder 18 and the intermediate segment 46 of the U-shaped support member being attached to a second portion of said hinge. In lieu of a hinge, a hook and loop fastener combination (not shown) may be used to attach the intermediate segment 46 to the backside of the picture holder 18. The preferred alternative for simplicity, ease of manufacture and use, and minimizing production costs features the hook-shaped connector portions 50 molded as part of the backside of the transparent polymeric picture holder 18 wherein the intermediate segment 46 frictionally snaps into the aperture formed by the hook portions 50.

FIGS. 5–6 depict the picture frame 10 mounted to a dashboard's ventilation grill assembly 14. In most vehicles, the horizontal portions of the ventilation grill assembly is located in front of the grill assembly and the present invention is mounted by slightly squeezing the distal ends of the U-shaped support member, inserting the ends through the horizontal grill, and releasing the distal ends so that they engage the vertical grill portion of the ventilation grill assembly 14. For grill assemblies with the vertical portion in front of the horizontal portion, the distal ends would engage the vertical portion directly as depicted in FIG. 6. If a clip 36 is added as an additional feature as depicted in FIGS. 7–10, then the clip may be attached to any convenient attachment on the dashboard or it may be attached to an interior visor of an automobile.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also understood that the following claims are intended to cover all of the generic and specific features of the invention herein described, and all statements of the scope of the invention which, as a matter of language, might be said to fall therebetween.

Now that the invention has been described,

What is claimed is:

1. A method for mounting a picture from a dashboard ventilation grill assembly of an automobile comprising the steps of:

inserting a picture in a slot opening of a transparent polymeric picture holder, the picture holder having a flat first portion parallel to a flat second portion, the portions being integrally connected along a bottom edge of said holder and the portions thereby sandwiching the picture between said portions;

pivotally attaching an intermediate segment of a U-shaped support member to a backside of the transparent polymeric picture holder at a location in an upper halve portion of said backside to two or more longitudinal hook-shaped connector portions wherein a base of each connector portion is integrally secured to the backside of the transparent polymeric picture holder and a distal end of a hook formed by the hook-shaped connector portion faces an opposite distal end of another hook-shaped connector portion in a spaced-apart relationship such that the intermediate segment of the U-shaped support member frictionally snaps through the space formed by the distal end opposing hook-shaped connector portions an opening formed by the opposing longitudinal hook-shaped connector portions secured to the backside of the picture holder, the U-shaped support member further including a first and second segment, the first and second segments being integrally joined at approximately a 90° angle to each end of the intermediate segment, each first and second segments further having a distal end wherein the distal ends are bent at approximately 90° in a direction proximately aligned with the intermediate segment and generally directed opposite each other;

squeezing the distal ends of the U-shaped support member; and inserting said distal ends in a ventilation grill assembly of an automobile dashboard such that the 90° bent segments at the distal ends detachably engages vertical grill portions within the ventilation grill assembly when the squeezed distal ends are released.

2. A method for mounting a picture from a dashboard ash tray compartment or a glove box compartment of an automobile comprising the steps of:

inserting a picture in a slot opening of a transparent polymeric picture holder, the picture holder having a flat first portion parallel to a flat second portion, the portions being integrally connected along a bottom edge of said holder and the portions thereby sandwiching the picture between said portions;

pivotally attaching an intermediate segment of a U-shaped support member to a backside of the transparent polymeric picture holder at a location in an upper halve portion of said backside to two or more longitudinal hook-shaped connector portions wherein a base of each connector portion is integrally secured to the backside of the transparent polymeric picture holder and a distal end of a hook formed by the hook-shaped connector portion faces an opposite distal end of another hook-shaped connector portion in a spaced-apart relationship such that the intermediate segment of the U-shaped support member frictionally snaps through the space formed by the distal end opposing hook-shaped connector portions into an opening formed by the opposing longitudinal hook-shaped connector portions secured to the backside of the picture holder, the U-shaped support member further including a first and second segment, the first and second segments being integrally joined at approximately a 90° angle to each end of the intermediate segment, each first and second segments further having a distal end wherein the distal ends are bent at approximately 90° in a direction proximately aligned with the intermediate segment and generally directed opposite each other; and inserting said distal ends in a dashboard ash tray compartment or a glove box compartment of an automobile such that the 90° bent segments at the distal ends detachably engages the ash tray compartment when a cover of the ash tray compartment is closed or the glove box compartment when a door to the glove box compartment is closed.

3. A method for mounting a picture from a dashboard ventilation grill assembly, ash tray compartment or glove box compartment of an automobile comprising the steps of:

inserting a picture in a slot opening of a transparent polymeric picture holder, the picture holder having a flat first portion parallel to a flat second portion, the portions being integrally connected along a bottom edge of said holder and the portions thereby sandwiching the picture between said portions;

pivotally attaching an intermediate segment of a U-shaped support member to a backside of the transparent polymeric picture holder at a location in an upper halve portion of said backside, the U-shaped support member further including a first and second segment, the first and second segments being integrally joined at approximately a 90° angle to each end of the intermediate segment, each first and second segments further having a distal end wherein the distal ends are bent at approximately 90° in a direction proximately aligned with the intermediate segment and generally directed opposite each other;

securing a spring-tensioned clip to an end of a flexible elongated strap and wrapping an opposite end of said strap around the intermediate segment of the U-shaped support member and further detachably joining said opposite ends of the strap at a location juxtaposed the secured spring-tensioned clip; and clipping said spring-tensioned clip to a ventilation grill assembly, an ash tray compartment cover or a glove box compartment door of an automobile dashboard.

4. A method for mounting a picture from a dashboard ventilation grill assembly, an ash tray compartment or a glove box compartment of an automobile comprising the steps of:

inserting a picture in a slot opening of a transparent polymeric picture holder, the picture holder having a flat first portion parallel to a flat second portion, the portions being integrally connected along a bottom edge of said holder and the portions thereby sandwiching the picture between said portions;

pivotally attaching an intermediate segment of a U-shaped support member to a backside of the transparent polymeric picture holder at a location in an upper halve portion of said backside, the U-shaped support member further including a first and second segment, the first and second segments being integrally joined at approximately a 90° angle to each end of the intermediate segment, each first and second segments further having a distal end wherein the distal ends are bent at approximately 90° in a direction proximately aligned with the intermediate segment and generally directed opposite each other;

securing a spring-tensioned clip to an end of a rigid elongated member, the rigid elongated member having an aperture at an opposite end through which the intermediate segment of the U-shaped support member passes; and clipping said spring-tensioned clip to a ventilation grill assembly, an ash tray compartment cover or a glove box compartment door of an automobile dashboard.

5. A picture frame for mounting a picture from an automobile dashboard ventilation grill assembly, ash tray compartment, and glove box compartment, the picture frame comprising:

a transparent polymeric picture holder having a flat first portion parallel to a flat second portion, the portions being integrally connected along a bottom edge of said holder;

a slot between the parallel portions of said polymeric picture holder for receiving a picture to be displayed;

a U-shaped support member, wherein the U-shaped support member includes an intermediate segment and a first and second segment, the first and second segments being integrally joined at approximately a 90° angle to each end of the intermediate segment, each first and second segment further having a distal end;

means for pivotally attaching the intermediate segment of the U-shaped support member to a backside of the transparent polymeric picture holder at a location in an upper halve portion of said backside, the intermediate segment being aligned parallel to the bottom edge of the picture holder such that the center of gravity of the picture holder with the attached U-shaped support member maintains the slot for inserting the picture oriented above the bottom edge when said picture holder is hung from a predetermined location on a dashboard of an automobile;

the means for pivotally attaching the intermediate segment of the U-shaped support member to the backside of the transparent polymeric picture holder further includes two or more longitudinal hook-shaped connector portions wherein a base of each connector portion is integrally secured to the backside of the transparent polymeric picture holder and a distal end of a hook formed by the hook-shaped connector portion faces an opposite distal end of another hook-shaped connector portion in a spaced-apart relationship such that the intermediate segment of the U-shaped support member frictionally snaps through the space formed by the distal end opposing hook-shaped connector portions into an opening formed by the opposing longitudinal hook-shaped connector portions secured to the backside of the picture holder; and means for detachably securing the U-shaped support member from the predetermined location on the dashboard of an automobile.

6. The picture frame according to claim 5, wherein the means for detachably securing the U-shaped support member from the predetermined location on the dashboard of an automobile comprises the U-shaped support member including the intermediate segment and the first and second segments, each having distal ends, wherein the distal ends of the first and second segments of the U-shaped support member are bent at approximately 90® in a direction proximately aligned with the intermediate segment and generally directed opposite each other.

7. The picture frame according to claim 6, wherein the U-shaped support member is made of polymeric material.

8. The picture frame according to claim 6, wherein the U-shaped support member is a wire.

9. A picture frame for mounting a picture from an automobile dashboard ventilation grill assembly, ash tray compartment, and glove box compartment, the picture frame comprising:

a transparent polymeric picture holder having a flat first portion parallel to a flat second portion, the portions being integrally connected along a bottom edge of said holder;

a slot between the parallel portions of said polymeric picture holder for receiving a picture to be displayed;

a U-shaped support member, wherein the U-shaped support member includes an intermediate segment and a first and second segment, the first and second segments being integrally joined at approximately a 90° angle to each end of the intermediate segment, each first and second segment further having a distal end;

means for pivotally attaching the intermediate segment of the U-shaped support member to a backside of the transparent polymeric picture holder at a location in an upper halve portion of said backside, the intermediate segment being aligned parallel to the bottom edge of the picture holder such that the center of gravity of the picture holder with the attached U-shaped support member maintains the slot for inserting the picture oriented above the bottom edge when said picture holder is hung from a predetermined location on a dashboard of an automobile; and means for detachably securing the U-shaped support member from the predetermined location on the dashboard of an automobile, the means for detachably securing the U-shaped support member including a spring-tensioned clip, the clip being secured to an end of a flexible elongated strap, an opposite end of the strap being wrapped around the intermediate segment of the U-shaped support member and the opposite ends further being detachably joined juxtaposed the clip.

10. The picture frame according to claim 9, wherein the means for detachably securing the U-shaped support member from the predetermined location on the dashboard of an automobile comprises the U-shaped support member including the intermediate segment and the first and second segments, each having distal ends, wherein the distal ends of the first and second segments of the U-shaped support member are bent at approximately 90° in a direction proximately aligned with the intermediate segment and generally directed opposite each other.

11. The picture frame according to claim 10, wherein the U-shaped support member is made of polymeric material.

12. The picture frame according to claim 10, wherein the U-shaped support member is a wire.

13. A picture frame for mounting a picture from an automobile dashboard ventilation grill assembly, ash tray compartment, and glove box compartment, the picture frame comprising:

A transparent polymeric picture holder having a flat first portion parallel to a flat second portion, the portions being integrally connected along a bottom edge of said holder;

a slot between the parallel portions of said polymeric picture holder for receiving a picture to be displayed;

a U-shaped support member, wherein the U-shaped support member includes an intermediate segment and a first and second segment, the first and second segments being integrally joined at approximately a 90° angle to each end of the intermediate segment, each first and second segment further having a distal end;

means for pivotally attaching the intermediate segment of the U-shaped support member to a backside of the transparent polymeric picture holder at a location in an upper halve portion of said backside, the intermediate segment being aligned parallel to the bottom edge of the picture holder such that the center of gravity of the picture holder with the attached U-shaped support member maintains the slot for inserting the picture oriented above the bottom edge when said picture holder is hung from a predetermined location on a dashboard of an automobile; and means for detachably securing the U-shaped support member from the predetermined location on the dashboard of an automobile, the means for detachably securing the U-shaped support member further includes a spring-tensioned clip, the clip being secured to an end of a rigid elongated member, the rigid elongated member having an aperture at an opposite end, the intermediate segment of the U-shaped support member passing therethrough for providing a rotatable rigid elongated member.

14. The picture frame according to claim 13, wherein the means for detachably securing the U-shaped support member from the predetermined location on the dashboard of an automobile comprises the U-shaped support member including the intermediate segment and the first and second segments, each having distal ends, wherein the distal ends of the first and second segments of the U-shaped support member are bent at approximately 90° in a direction proximately aligned with the intermediate segment and generally directed opposite each other.

15. The picture frame according to claim 14, wherein the U-shaped support member is made of polymeric material.

16. The picture frame according to claim 14, wherein the U-shaped support member is a wire.

\* \* \* \* \*